Feb. 12, 1957     E. J. WAGNER     2,781,466
INDUCTION MOTOR ROTOR ASSEMBLY
Filed May 4, 1954
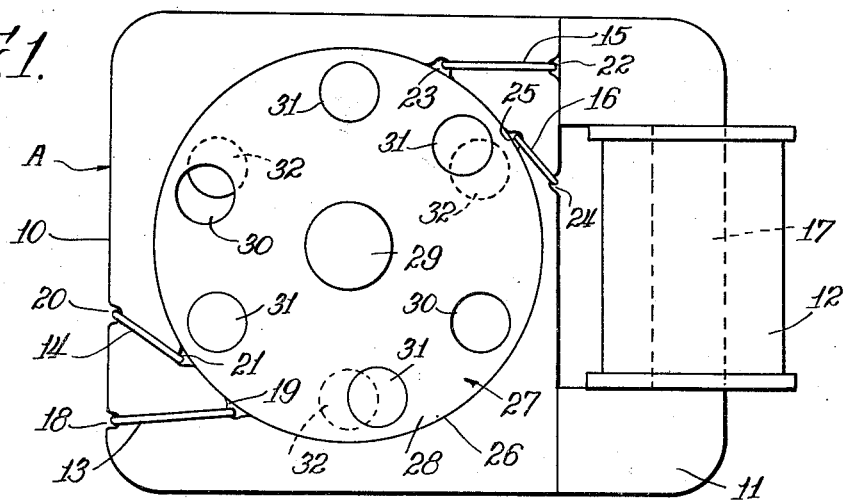
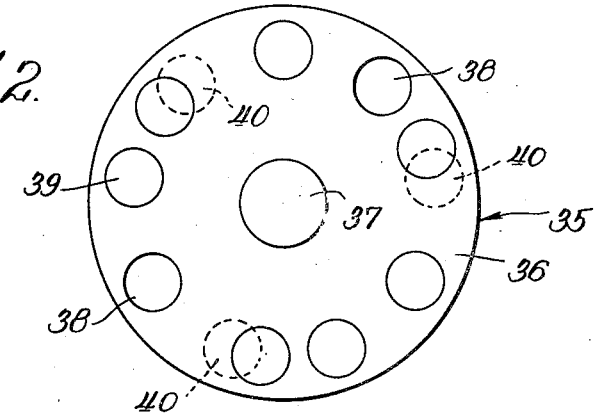
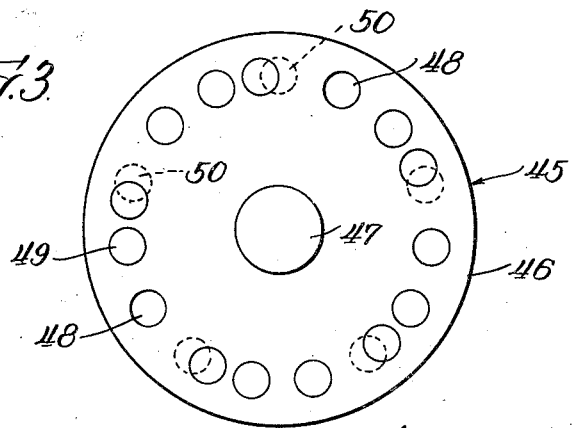
INVENTOR.
Edward J. Wagner

United States Patent Office 2,781,466
Patented Feb. 12, 1957

2,781,466

INDUCTION MOTOR ROTOR ASSEMBLY

Edward J. Wagner, Berwyn, Ill., assignor to Dormeyer Corporation, Chicago, Ill., a corporation of Illinois Application May 4, 1954, Serial No. 427,450

9 Claims. (Cl. 310—211)

This invention relates to an induction motor rotor assembly, and more particularly to a rotor for single phase induction motors equipped with shading coils for providing torque, and which are generally referred to as shaded pole motors. The invention, however, is useful in other single phase motors and will improve the characteristics thereof.

In induction motors, rotation of the rotor is brought about by reaction between the magnetic field produced by the current flow in the stator and the magnetic field produced by the induced current flow in the rotor. In single phase induction motors there would be no net reaction between the stator and rotor fields and to produce starting torque it is necessary to provide auxiliary devices. These devices generally take the form of shading coils, especially where squirrel cage rotors are employed and are operative to alter the reluctance of the stator in certain areas thereof which is effective to provide in the stator but may be considered a rotating field. A resultant reactance between the stator and rotor fields is thereby established and the motor is provided with starting torque. Such torque, nevertheless, being relatively low unless the squirrel cage rotor is especially designed to produce a relatively large starting torque, and in such a case the running efficiency of the motor is sacrificed.

In single phase motors the stator field is essentially pulsating. The torque developed in motors of this type is characterized, therefore, by a series of pulses or kicks. As a result, the motor vibrates and produces a noise or hum, both of which are especially accentuated when the rotor approaches synchronous speed.

I have discovered that the squirrel cage rotor of a single phase motor can be modified so as to substantially eliminate the results of the kicking effect of the pulsating stator field, and this is accordingly one of the objects of this invention.

Another object of the invention is to provide a shaded pole motor wherein the starting torque is improved without sacrificing the operating efficiency of the motor.

Still another object is to provide in a shade pole motor a squirrel cage rotor having characteristics that will provide the motor with both increased starting and running torque, and which will counteract the effects of the pulsating stator field so as to substantially eliminate noise or hum and vibration.

A further object is in providing a motor rotor, preferably of the squirrel cage type, which has a number of displaced or unsymmetrical conductors carried thereby; the displacement being such that there will be a cancellation of some of the harmonics in the resultant torque. Yet a further object is in the provision of a squirrel cage rotor having a plurality of conducting bars extending longitudinally therethrough in substantially equally spaced apart relation about a circle generally concentric with the rotational axis of the rotor; at least some of the bars being displaced or offset in an arrangement such that the flux produces forces acting on the rotor at diametrically opposite points thereon which are unequal.

Additional objects and advantages will appear as the specification proceeds.

Embodiments of the invention are illustrated in the accompanying drawings in which:

Fig. 1 is an end view in elevation of a typical shaded pole motor embodying my invention;

Fig. 2 is an end view in elevation of a modified form of rotor; and

Fig. 3 is an end view in elevation of still a further modified form of rotor.

A generally typical shaded pole motor is illustrated in Fig. 1 of the drawings. It should be made clear, however, that although a shaded pole motor is illustrated and will be described in detail, the invention is useful in all single phase motors. I have found that it is especially useful in shade pole motors and therefore show and describe the invention in this environment. The motor illustrated in Fig. 1 is designated generally with the letter "A."

The motor A comprises a stator 10 that is formed by a stator core which is designated with the numeral 11 and the main field winding 12 and shading coils 13, 14, 15 and 16. The core 11 may be completely conventional and may constitute a plurality of laminations insulated from each other and joined together in stacked relation. The core provides a pole 17 upon which the winding 12 is mounted. The winding 12 may be conventional and similarly the shading coils 13 through 16 may all be conventional. Preferably the shading coils are mounted within slots or recesses 18 through 25 and each pair of recesses accept one of the shading coils. The core 11 is provided centrally with an enlarged circular opening 26 therethrough in which is rotatably mounted the rotor 27. Since stator assemblies of the character described are well known in the art, it is believed unnecessary to set forth a further description thereof for purposes of adequately understanding the present invention.

The rotor 27 is preferably of the squirrel cage type and may comprise an iron core 28 that is formed of laminations insulated from each other and assembled in a stack having an overall longitudinal length equal to that of the stator. The core 28 is provided centrally with a longitudinally extending shaft 29 that provides the rotational axis for the core and rotor. The shaft 29 extends through a suitable bore provided through the rotor core and may be anchored in position by any suitable means that are well known.

The core 28 is provided with a plurality of longitudinally extending openings 30 therethrough, each of which is adapted to receive therein the elongated conductors 31. The openings 30 are spaced radially outwardly from the rotational axis of the core 28 and preferably all lie along a circle that is concentric with the rotational axis of the rotor or shaft 29. In the illustration of Fig. 1, the openings 30 are shown with the shafts or conductors removed for the purposes of making the structure clear. It will be appreciated that each of the openings will be provided with a conductor 31 when the motor is completely assembled and in condition for operation.

As is well known, the conductors 31 are preferably bars or shafts that are formed from copper and which are interconnected at the ends of the core 28, preferably by forming the outer laminations of the core from copper or some other equally good conducting material and by electrically connecting the conductors to these outer copper laminations. The conductors 31 have voltages induced therein when current flows through the main motor field windings 12.

Normally the conductors that extend longitudinally through the rotor are equally spaced apart. I have found that the undesirable combination of noise, vibration, and relatively low torque can be altered considerably by changing the spacing between at least some of the conductors 31 carried by the core 28.

For example, by referring to Fig. 1, it is seen that if the openings 30 and, of course, the conductors 31 which are carried within the openings, were all equally spaced apart, three of the openings and shafts would have to be shifted in a clockwise direction about the core 28. In order to better show the usual construction, the shafts or conductors and openings which would have to be shifted are shown in dotted lines and are indicated by the numeral 32. It is apparent, then, that if the six openings and conductors were all equally spaced apart they would be matched in diametrically opposed pairs. In that condition, the forces created by the magnetic fields and which would act upon the rotor 27 at points 180° apart would be substantially equal, with the result that the torque produced would be pulsating. Where at least some of the openings and the conductors carried thereby are offset or are unequally spaced between the adjacent conductors, the forces acting upon the rotor 27 at diametrically opposed points is not the same, and the undesirable effects of the pulsating stator field are thereby overcome. Preferably in the simplest form of squirrel cage rotor, where there are six conductors as shown in Fig. 1, alternate conductors are offset so that the spacing between them and the conductors adjacent thereto is unequal. It may be noted that while the spacing between the offset conductors and those adjacent thereto is unequal, the offset conductors are all equally spaced from each other.

The modified form of squirrel cage rotor is illustrated in Fig. 2, and in this embodiment of the invention the only difference from the rotor described in Fig. 1 is that a greater number of longitudinal openings and conductors are provided. In this modification, the rotor is indicated with the numeral 35 and it is seen that it comprises a core 36 equipped with a shaft 37 that provides a rotational axis therefor. The core 36 is provided with a plurality of spaced apart openings therethrough that all lie along a circle concentric with the rotational axis defined by the shaft 37. For the purpose of clarity, some of the openings through the core have had the conductors removed therefrom and these openings are designated with the numeral 38. On the other hand, the conductors or bars extending through the openings are designated with the numeral 39.

In this form of the invention, several of the openings and conducting bars are offset relative to those adjacent thereto, and if such bars were not offset, they would assume the position shown by the dotted lines and such positions are designated with the numeral 40. The specific structure shown in Fig. 2 includes a rotor core having nine openings therethrough. It is apparent from the showing that every second bar is offset relative to those adjacent thereto and specifically three of the bars are staggered or offset. All of the openings and conducting bars lie on spaced apart radial lines that extend outwardly from the rotational axis of the rotor 35. At the same time all of the openings lie along a circle that is concentric with the rotational axis, and which is spaced inwardly from the outer circumferential surface of the cylindrical core 36.

The structure shown in Fig. 3 is a further modification and the rotor 45 there-disclosed comprises a rotor core 46 equipped centrally with a shaft 47 and having a plurality of spaced apart openings 48 extending longitudinally therethrough. Each of the openings 48 is equipped with a conducting bar 49 extending to the ends of the core, and all of the bars are electrically connected together at the ends of the core. For the sake of clarity, the openings 48 are shown with the bars removed therefrom.

In this form of the invention, the core 46 is provided with fifteen spaced apart openings therethrough which all lie on spaced apart lines extending radially outwardly from the rotational axis of the rotor. As in the case of the embodiments shown in Figs. 1 and 2, the openings all lie on a circle concentric with the shaft 47. It is seen that five of the openings are displaced and are unsymmetrically oriented between the openings adjacent thereto. The position of these bars and openings, if they were not offset, is shown by the dotted lines which are given the numeral 50.

Rotors may be provided with any suitable number of openings and conducting bars extending therethrough. For example, a rotor may have six, nine, twelve, fifteen, eighteen and twenty-one bars, and in such case three of the bars could be offset. A rotor might have fifteen, twenty, twenty-five or thirty bars and in this event five of the bars could be offset. If, for example, the rotor had twenty-one, twenty-eight or thirty-five bars, it would be preferable to offset seven of the bars. It should be mentioned that some advantages might be achieved by making the resistances of the unsymmetrical or offset bars different from that of the other conducting bars. This could be accomplished readily by simply changing the diameter of the bar and perhaps the diameter of the opening or bore extending through the rotor that carries the same.

A motor formed in accordance with the invention operates in substantially the same manner as motors known in the prior art. Current flowing through the main field windings induces a current flow through the conducting bars carried by the squirrel cage rotor. The shading coils are effective to vary the reluctance between the rotor and stator at different points thereabout, with the result that the stator field is in effect a rotating field. Thus the shading coils are operative to provide the requisite starting torque for the motor.

With the offset bar arrangement that has been shown, the forces acting upon the rotor at diametrically opposed points thereon are different in magnitude and this results in providing the motor with greater torque. The torque is greater both for starting and for running, which means that the power of the motor is considerably increased. At the same time, the undesirable effects of the pulsating stator field which produces a pulsating torque are eliminated to a considerable degree, and it is found that the motor is substantially noiseless and vibrationless in operation. Therefore, altogether, the motor provided is a considerable advance over shaded pole motors now commercially used.

While in the foregoing specification an embodiment of the invention has been set out in considerable detail for purposes of illustration, it will be apparent to those skilled in the art that numerous changes may be made of these details without departing from the spirit and principles of the invention.

I claim:

1. In a rotor for a motor, a core adapted to be rotated and being provided with a plurality of longitudinally extending openings therein adapted to carry conductors of like characteristics, said openings being oriented in spaced apart relation around said core and at least some of said openings being unequally spaced between those adjacent thereto and those diametrically opposite thereto.

2. In a rotor for a motor, a core adapted to be rotated and being provided with a plurality of longitudinally extending openings therein, adapted to carry conductors of equal characteristics, said openings being positioned on spaced apart lines extending radially outwardly from the rotational axis of said core, said lines being for the most part equally spaced apart but at least some thereof being off center relative to those adjacent thereto and those diametrically opposite thereto.

3. In a rotor for a single phase motor, a core adapted to be rotated and being provided with a plurality of longitudinally extending openings, conductors of like characteristics carried in said openings, said openings and conductors lying along a circle concentric with the rotational axis of said core and, for the most part, being equally spaced apart, at least some of said openings being unequally spaced between the openings on each side thereof and openings diametrically opposite thereto.

4. The structure of claim 3 in which said unequally spaced openings are equally spaced apart from each other.

5. The structure of claim 4 in which said unequally spaced openings comprise an odd number of openings.

6. In a single phase motor, a rotor assembly comprising a generally cylindrical core adapted to be rotated, said core being provided with a plurality of openings therein extending longitudinally thereof generally parallel with the axis of rotation, conductors of like characteristics mounted within said openings, said openings being oriented along a circle concentric with the axis of rotation of said core and being spaced outwardly therefrom, said openings being spaced apart along said circle, some being spaced between those adjacent thereto and those diametrically opposite thereto by unequal distances.

7. The structure of claim 6 wherein the total number of openings comprises an odd number, and wherein the unequally spaced openings are an odd number.

8. The structure of claim 7 in which there is an unequally spaced opening between every two of the remaining openings.

9. In a single phase induction motor provided with shading coils, a rotor assembly comprising a generally cylindrical core adapted to be rotated, said core being provided with a plurality of openings therein extending longitudinally thereof generally parallel to the axis of rotation, conductors mounted within said openings, said openings being oriented along a circle concentric with the axis of rotation of said core and being spaced outwardly therefrom, a number of said openings being equally spaced from each other on one side thereof, and the remainder of said openings being interposed between said last-mentioned openings and being equally spaced from each other but offset relative to the openings adjacent thereto diametrically opposite said equally spaced openings.

References Cited in the file of this patent

UNITED STATES PATENTS

| 919,527 | Bergman | Apr. 27, 1909 |
| 1,491,375 | Bergman | Apr. 22, 1924 |

FOREIGN PATENTS

| 664,167 | Germany | Aug. 22, 1938 |